June 13, 1939.　　　　F. L. MAIN　　　　2,161,900
BRAKE MECHANISM
Filed July 26, 1937
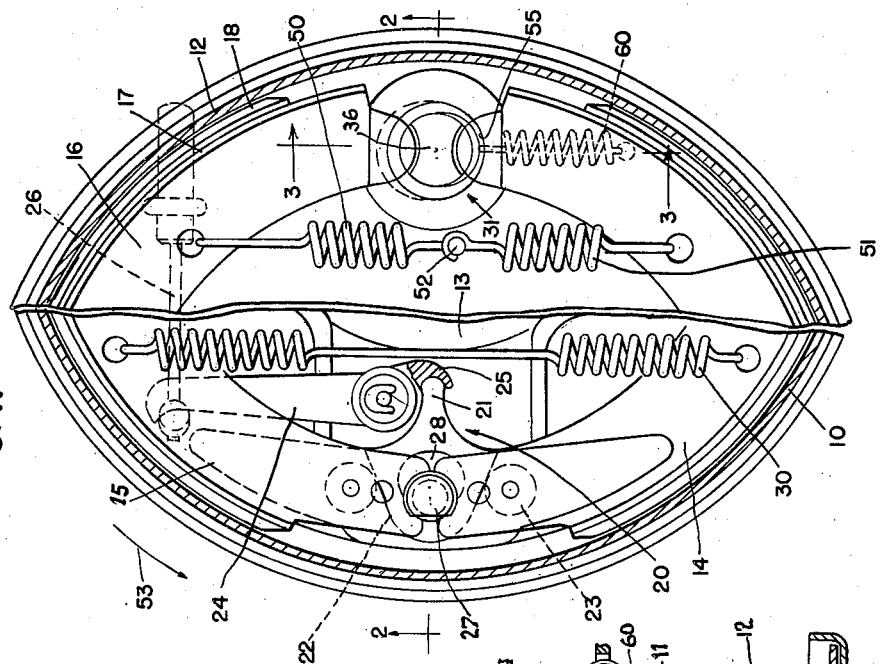
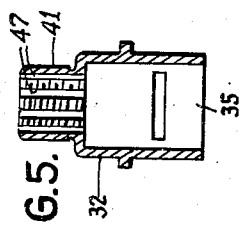
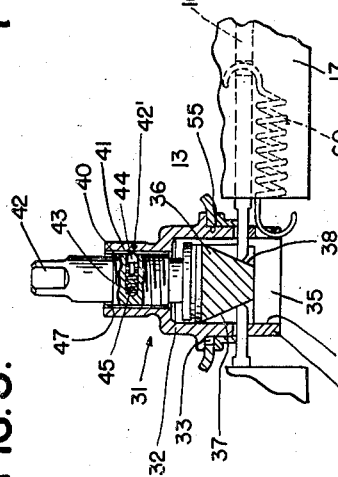
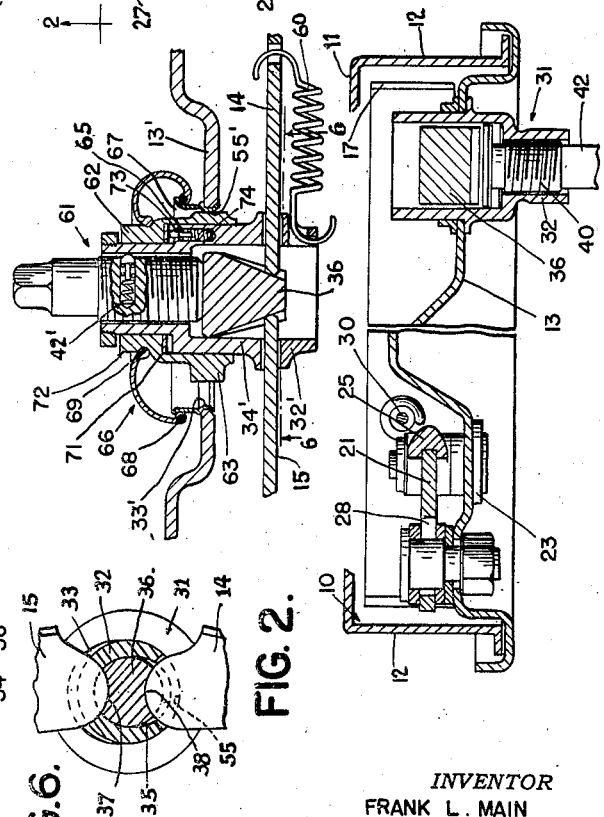
INVENTOR
FRANK L. MAIN
BY
Whittemore Hulbert & Belknap
ATTORNEYS Patented June 13, 1939

2,161,900

UNITED STATES PATENT OFFICE 2,161,900

BRAKE MECHANISM

Frank L. Main, Birmingham, Mich., assignor to
Kelsey-Hayes Wheel Company, Detroit, Mich.,
a corporation of Michigan Application July 26, 1937, Serial No. 155,804

12 Claims. (Cl. 188—79.5)

This invention relates generally to brake mechanisms and refers more particularly to brake constructions of the type employed in connection with vehicle wheels.

One of the principal objects of the present invention consists in improving generally brake constructions of the type having brake friction means supported in the brake drum for shifting movement in opposite directions to provide for securing a servo action in either of the directions of rotation of the drum.

Another advantageous feature of this invention resides in the provision of brake mechanism having brake friction means provided with spaced ends and having an adjustment device supported between the ends of the friction means at one side of the drum for shifting movement with the friction means in either direction of rotation of the brake drum.

A further object of the present invention resides in the provision of an adjustment device having a bracket supported between the ends of the friction means for shifting movement with the friction means in one direction of rotation of the brake drum and having an adjustable wedge supported in the bracket for shifting movement in the opposite direction of rotation of the drum. With this construction, the wedge and bracket cooperate with one another to provide for transferring torque from one shoe to the other in both directions of rotation of the brake drum.

In addition to the foregoing, the present invention contemplates improved means for centering the brake friction means within the drum and the manner in which this is accomplished, as well as the foregoing and other objects, will be made more apparent as this description proceeds, especially when considered in connection with the accompanying drawing, wherein:—

Figure 1 is a side elevational view of a brake having certain parts broken away for the sake of clearness;

Figure 2 is a sectional view taken substantially on the plane indicated by the line 2—2 of Figure 1;

Figure 3 is a sectional view taken substantially on the plane indicated by the line 3—3 of Figure 1;

Figure 4 is a sectional view of a slightly modified form of construction;

Figure 5 is a detail sectional view of the adjustment bracket; and

Figure 6 is a sectional view taken on the plane indicated by the line 6—6 of Figure 4.

The brake selected herein for the purpose of illustration is provided with a brake drum 10 having a web 11 and having an annular flange 12 extending axially from the periphery of the web 11. In accordance with conventional practice, the brake drum is secured to the vehicle wheel for rotation in opposite directions by the wheel relative to a backing plate 13 which closes the rear side of the drum and forms a support for the brake friction means. In the present instance, the brake friction means comprises two shoes 14 and 15 supported on the backing plate with the opposite ends thereof spaced from each other circumferentially of the brake drum.

In the present instance, the shoes are T-shaped in cross section having webs 16 extending radially of the drum and having flanges 17 extending axially of the brake drum adjacent the annular flange 12. A brake lining 18 having the desired coefficient of friction is secured to the outer surface of the flange 17 of each shoe and this lining is adapted to frictionally engage the inner surface of the annular flange 12.

The shoes are moved outwardly relative to the brake drum to engage the friction linings 18 with the brake flange 12 by means of an actuator 20, shown in Figure 1 as being of the radially outwardly movable wedge type. It is to be understood, however, that any one of a number of differently designed actuators may be employed for operating the brake friction means without affecting the results secured by the present invention and, for this reason, the invention should not be considered as limited to the specific type of actuator selected for the purpose of illustration. However, the actuator employed must be of such a nature as to permit shifting movement of the friction means in both of the two directions of rotation of the brake drum. The actuator 20, shown herein, comprises a radially outwardly movable wedge 21 having radially inwardly diverging edges 22 engageable with suitable rollers 23 which are carried by the ends of the shoes at one side of the drum. The wedge is moved outwardly to expand the shoes into engagement with the brake flange by means of a lever 24 pivotally supported adjacent one end of the backing plate 13 and having the short arm 25 engageable with the radially inner end of the wedge 21. The extremity of the long arm of the lever is engaged by a flexible cable 26 which extends through the backing plate and is connected to a suitable control (not shown). The arrangement is such that when the long arm of the lever is swung in a direction generally inwardly of the brake drum by the cable 26, the short arm moves the wedge 21 radially outwardly to effect a corresponding outward movement of the brake shoes into engagement with the brake flange 12 of the drum.

Upon reference to Figure 1, it will be noted that the wedge is supported on the backing plate by means of a stud 27 extending axially of the drum through an opening 28 in the wedge. The dimensions of the opening 28 transversely of the wedge or periphery of the brake drum are greater than the diameter of the portion of the stud extending through the opening to provide the clearance required for the wedge to shift with the brake friction means in opposite directions circumferentially of the brake drum. In accordance with the usual practice, the stud also forms an abutment for the actuator ends of the shoes and the latter ends are yieldably maintained into engagement with the stud by means of the spring 30 having the opposite ends connected to the shoes adjacent the aforesaid ends thereof. In the present instance, the shoes may be adjusted to vary the clearance between the friction linings 18 in the shoes and the inner surface of the brake flange 12 on the drum. The above is accomplished by means of an adjustment device 31 having a bracket 32 extending through an opening 33 in the backing plate 13 and having a portion 34 extending between the ends of the brake shoes at the side of the drum opposite the actuator ends of the shoes. The portion 34 is provided with a bore 35 extending in a direction parallel to the axis of the drum and the opposite sides of the portion 34 are slotted to receive the adjacent ends of the web portions of the shoes.

The ends of the shoes extending into the bore 35 are moved outwardly about the axis of the stud 27 by means of a wedge 36 mounted in the bore 35 between the adjacent ends of the shoes for sliding movement axially of the bore 35. The opposite sides of the wedge 36 are provided with grooves 37 for receiving the adjacent ends of the shoes and the bottoms 38 of the grooves are transversely curved, as well as tapered inwardly from the rear side of the wedge 36. The adjacent ends of the shoes are correspondingly transversely curved to engage the bottoms 38 of the grooves 37 so that when the wedge 36 is moved axially of the drum in a forward direction, the shoes are moved outwardly toward the brake flange 12.

In the present instance, the wedge is adjustable axially of the bore 35 by means of the screw 40 threaded in a reduced portion 41 of the bracket and having the rear end 42 positioned exteriorly of the backing plate where it may be conveniently manipulated to effect the desired adjustment. Accidental rotation of the screw relative to the bracket 31 is prevented by means of a spring pressed detent 42' located within a recess 43 formed in the side of the screw and having a portion 44 normally urged into engagement with the inner surface of the reduced portion 41 of the bracket by means of a spring 45. In the present instance, the reduced portion 41 of the bracket is broached, or otherwise formed, to provide circumferentially spaced grooves 47 adapted to be successively engaged by the portion 44 of the detent to not only resist rotation of the screw, but to also indicate predetermined increments of adjustment.

With the above construction, it will be noted that when it is desired to adjust the brake shoes relative to the brake flange 12 on the drum, the wedge 36 is moved axially forwardly by the screw 40 the distance required to engage the friction linings 18 in the shoes with the brake flange and, after this is accomplished, the screw is backed off the extent required to secure the desired clearance between the friction linings 18 and the brake flange. In this connection, it will be noted that the wedge is yieldably maintained into abutting relation with the screw by means of the retracting springs 50 and 51 for the shoes. The outer ends of the retracting springs are shown as connected to the shoes adjacent their adjustment ends, and the inner ends of the springs are connected to a pin 52 secured to the backing plate.

It has previously been stated that torque is transferred from one shoe to the other through the adjustment device 31 in both directions of rotation of the brake drum. In the present instance, when the shoes are engaged with the brake flange 12 as the drum is rotating in the forward direction, indicated by the arrow 53 in Figure 1, the adjustment bracket 32 is shifted circumferentially of the drum in the direction of forward rotation. On the other hand, on application of the brake when the drum is rotating in the reverse direction, the adjustment wedge 36 is shifted with the shoes circumferentially of the drum in the reverse direction of rotation.

For accomplishing the above result, the opening 33 through the backing plate is of greater diameter than the portion of the bracket 32 extending through this opening and the internal diameter of the bore 35 is greater than the external diameter of the wedge 36. The bracket 32 is maintained into abutting engagement with the side 55 of the opening 33 adjacent the adjustment end of the shoe 14 by providing a greater retracting force on the shoe 15 than is applied to the shoe 14. This action is obtained by offsetting the pin 52 from a radial plane including the axis of the drum in a direction toward the shoe 14. As a consequence, the spring 50 will be stronger than the spring 51 and, owing to the fact that the adjustment end of the shoe 15 engages the adjacent side of the bracket 32, as well as the wedge 36, it follows that this bracket will normally be maintained into abutting engagement with the side 55 of the opening 33. The wedge 36, however, is maintained into abutting engagement with the side 56 of the bore adjacent the adjustment end of the shoe 15 or, in other words, the wedge 36 is maintained in engagement with the side of the bore 35 which is opposite the side 55 of the opening 33. This is accomplished by means of a tension spring 60 having one end connected to the web of the shoe 14 and having the opposite end connected to the bracket 32. The strength of the spring 60 is so determined that it maintains the wedge 36 into engagement with the side 56 of the bore 35 in the bracket 32 when the brake is in its released position. In this connection, it will be noted that the adjustment end of the shoe 14 does not engage the bracket 32 so that the spring 60 will not interfere with the operation of the spring 51 in maintaining the bracket 32 in abutting engagement with the side 55 of the opening 33.

With the above construction, it will be noted that the torque generated in the shoe 14, by application of the shoes in the forward direction of rotation of the drum, shifts the bracket 32 in a corresponding direction and thereby transfers the torque from the shoe 14 to the shoe 15. On the other hand, when the brake drum is rotating in the reverse direction and the brake is applied, the torque generated by the shoe 15 shifts the wedge 36 in the reverse direction and transfers the torque from the shoe 15 to the shoe 14 through the wedge. Also, as a result of the foregoing, the brake shoes are positively centered in their released positions in the brake drum.

The adjustment device 61, shown in the embodiment of the invention illustrated in Figure 4, differs from the one previously described in that provision is made for adjusting the position of the adjustment device to provide for accurately centering the brake shoes in the drum during assembly. In detail, a sleeve 62 is rotatably mounted on the portion 34' of the bracket 32' and is provided with an eccentric portion 63 engageable with the side 55' of the opening 33' to the backing plate 13' to center the brake shoes in the drum. It will be observed that by rotating the sleeve 62 about the axis of the bracket 32', the eccentric 63 on the sleeve will cooperate with the side 55' of the opening 33' to shift the adjustment device and brake shoes circumferentially of the drum. To prevent accidental rotation of eccentric 63 after the brake shoes have been properly centered, there is provided a circular stamping 71 having a plurality of serrations. This stamping has a pressed fit in the bottom of the bore of sleeve 62. The serrations of the stamping are engaged by a pin 73 normally urged toward the stamping by a spring 74 assembled in the end of the portion 34' of the bracket. Convenient flats 72 on sleeve 62 may be engaged by a wrench, and sleeve 62 with its eccentric 63 can be turned thereby on portion 34' to center the brake shoe assembly without removing the drum. The engagement of the spring pressed detent 65 in the serrations of the ring 71 prevents accidental rotation of the sleeve 62 and eccentric 63.

With the above construction, the opening 33' through the backing 13' is slightly larger in diameter than the opening 33 to compensate for the eccentric portion 63 on the sleeve and this opening is sealed by means of the cap 66. In detail, the seal comprises a sheet metal sleeve 67 having the forward end crimped around the marginal edges of the opening 33' and having the rear end flared for engagement with a flexible ring 68. The ring 68 is preferably formed of rubber so as not to interfere with shifting movement of the adjustment device and is adapted to yieldably grip the sleeve 62 in a manner designated by the reference character 69 in Figure 4. With the above exceptions, the embodiment of the invention illustrated in Figure 4 is the same as the adjustment device previously described and operates in a like manner.

What I claim as my invention is:

1. In brake mechanism, a brake drum rotatable in opposite directions, brake friction means supported within the drum for shifting movement relative to the drum in both directions of rotation of said drum and having spaced ends, a bracket member having a portion generally disposed between the ends of the friction means and supported in the released position of the friction means for shifting movement with the friction means in one direction circumferentially of the drum, and means slidably mounted on the bracket between the ends of the friction means for moving the latter outwardly relative to the drum including an element supported in the released position of the friction means for shifting movement with the latter circumferentially of the drum relative to the bracket member in a direction opposite the direction of shifting movement aforesaid of the bracket.

2. In brake mechanism, a brake drum rotatable in opposite directions, brake friction means supported within the drum for shifting movement relative to the drum in both directions of rotation of said drum and having spaced ends, a bracket member having a portion generally disposed between the ends of the friction means and supported in the released position of the friction means for shifting movement with the friction means in one direction circumferentially of the drum, yieldable means resisting shifting movement of the bracket with the friction means, means slidably mounted on the bracket between the ends of the friction means for moving the latter outwardly relative to the drum including an element supported in the released position of the friction means for shifting movement with the latter circumferentially of the drum relative to the bracket member in a direction opposite the direction of shifting movement aforesaid of the bracket, and yieldable means resisting shifting movement of the element relative to the bracket.

3. In brake mechanism, a brake drum rotatable in opposite directions, brake friction means supported within the drum for shifting movement relative to the drum in both directions of rotation of said drum and having spaced ends, a bracket member having a portion generally disposed between the ends of the friction means and supported in the released position of the friction means for shifting movement by the friction means relative to the drum in one direction and having a bore extending axially of the drum, means slidably supported in the bore of the bracket between the ends of the friction means for moving the latter outwardly relative to the drum including an element having a dimension circumferentially of the drum less than the corresponding dimension of the bore, and yieldable means effective in the released position of the friction means to maintain the element into engagement with the side of the bore facing the aforesaid direction of shifting movement of the bracket whereby said element is capable of shifting movement with the friction means relative to the bracket in the opposite direction.

4. In brake mechanism, a brake drum rotatable in opposite directions, brake friction means supported within the drum for shifting movement relative to the drum in both directions of rotation of said drum and having spaced ends, a member having a portion generally disposed between the ends of the friction means and having a side adjacent one of the ends of the friction means engaged by the latter end portion of the friction means, means supporting the member in the released position of the friction means for shifting movement circumferentially of the drum in a direction toward the last named end of the friction means, an element movable in a direction parallel to the axis of the drum between the ends of the friction means with the opposite sides engaging said ends and mounted on said member for shifting movement circumferentially of the drum relative to the member in a direction opposite the direction of shifting movement aforesaid of the member, and means for adjusting the element axially of the drum to effect outward movement of the friction means relative to the drum.

5. In brake mechanism, a brake drum rotatable in opposite directions, brake friction means supported within the drum for shifting movement relative to the drum in both directions of rotation of said drum and having spaced ends, a bracket having a portion generally disposed between the ends of the friction means with the side thereof adjacent on of the ends of the friction means engaging the latter end portion of the friction means and having a bore extending in a direction parallel to the axis of the drum, means supporting the bracket in the released position of the friction means for shifting movement circumferentially of the drum in a direction toward the last named end of the friction means to transfer torque to said end of the friction means upon application of the brake when the drum is rotating in the direction of shifting movement, an element movable axially of the bore in the bracket with the opposite sides engaging the ends of the friction means to move the latter outwardly relative to the drum and having a diameter less than the diameter of the bore to provide for shifting movement of the element relative to the bracket circumferentially of the brake drum, and yieldable means effective in the released position of the friction means to maintain the element into engagement with the side of the bore in the bracket adjacent the side of the latter engaging said last named end of the friction means.

6. In brake mechanism, a brake drum rotatable in opposite directions, brake friction means supported within the drum for shifting movement relative to the drum in both directions of rotation of said drum and having spaced ends, a member having a portion generally disposed between the ends of the friction means and having the side thereof adjacent one end of the friction means engaging the latter end portion of the friction means, a stop engageable with the opposite side of said member, means supporting the member for shifting movement circumferentially of the drum in a direction toward the last named end of the friction means from a position in engagement with the stop, yieldable means normally maintaining said member in engagement with said stop, means carried by said member for adjusting the friction means relative to the brake drum including an element movable axially of the drum between the ends of the friction means with the opposite sides engaging said ends and movable circumferentially of the drum relative to said member in a direction toward the stop, and yieldable means normally maintaining the element in spaced relation to the stop.

7. In brake mechanism, a brake drum rotatable in opposite directions, brake friction means supported within the drum for shifting movement relative to the drum in both directions of rotation of said drum and having spaced ends, a bracket having a portion generally disposed between the ends of the friction means with the side thereof adjacent one end of the friction means engageable with the latter end portion of said friction means and having a bore extending in a direction parallel to the axis of the drum, a stop engageable with the opposite side of the bracket, means supporting the bracket for shifting movement circumferentially of the drum in a direction toward the last named end of the friction means from a position in engagement with the stop, yieldable means normally urging the bracket into engagement with the stop, an element movable axially of the bore in the bracket with the opposite sides engaging the ends of the friction means to effect movement of the latter outwardly relative to the drum and having a dimension transversely of the bore less than the diameter of the bore to provide for shifting movement of the element relative to the bracket circumferentially of the drum, and yieldable means effective in the released position of the friction means to maintain the element into engagement with the side of the bore in the bracket located opposite the side of the bracket engaged by said stop.

8. In brake mechanism, a brake drum rotatable in opposite directions, a backing plate for the brake drum, brake friction means supported on the backing plate within the drum for shifting movement relative to the backing plate in both directions of rotation of the drum and having spaced ends, a bracket having a bore extending axially of the brake drum and projecting through an enlarged opening in the backing plate to a position wherein portions of the bracket are generally disposed between the ends of the friction means with the side of the bracket adjacent one end of the friction means engaging the latter end portion, yieldable means normally urging the opposite side of the bracket into engagement with the adjacent side of the opening through the backing plate and providing for shifting movement of the bracket circumferentially of the drum in a direction toward the last named end of the friction means, means movable axially of the bore in the bracket between the ends of the friction means for adjusting the latter relative to the drum including an element having a dimension transversely of the bore less than the diameter of the bore, and yieldable means normally maintaining the element in engagement with the side of the bore adjacent the side of the bracket engaging the said last named end of the friction means.

9. In brake mechanism, a brake drum rotatable in opposite directions, a backing plate for the brake drum, brake friction means supported upon the backing plate within the drum for shifting movement relative to the drum in both directions of rotation of said drum and having spaced ends, a bracket having an axially extending bore and having a portion generally disposed between the ends of the friction means through an enlarged opening in the backing plate and having the side thereof adjacent one end of the friction means engageable with the latter end portion of the friction means, spring means connecting the last named end of the friction means with the backing plate to maintain the bracket into abutting relationship with the side of the opening opposite said last named end of the friction means, means movable axially of the bore in the bracket between the ends of the friction means for adjusting the latter relative to the brake drum including an element having a dimension transversely of the bore less than the diameter of the bore, spring means having one end connected to the other end of the friction means and having the opposite end connected to the adjacent side of the bracket to normally maintain the element into engagement with the side of the bore adjacent the first named end of the friction means.

10. In brake mechanism, a brake drum rotatable in opposite directions, brake friction means supported within the drum for shifting movment relative to the drum in both directions of rotation of said drum and having spaced ends, a member having a portion generally disposed between the ends of the friction means and having the side thereof adjacent one end of the friction means engaging the latter end portion, a stop engageable with the opposite side of the member, means supporting said member for shifting movement circumferentially of the drum in a direction away from the stop and toward the last named end of the friction means, yieldable means normally urging the member into engagement with the stop, means movable axially of the drum between the ends of the friction means for adjusting the latter relative to the drum including an element supported on said member for shifting movement circumferentially of the drum, yieldable means normally maintaining the element into abutting engagement with a portion of the member disposed opposite the side of the member engaged by the stop, and means for relatively adjusting the position of the member and stop circumferentially of the drum to accurately center the friction means in the drum.

11. In brake mechanism, a brake drum rotatable in opposite directions, a backing plate for the brake drum, brake friction means supported on the backing plate within the drum for shifting movement relative to the backing plate in both directions of rotation of the drum and having spaced ends, a bracket having an axially bored portion extending in a direction parallel to the axis of the drum through an enlarged opening in the backing plate and having a portion disposed generally between the ends of the friction means with the side of the bracket adjacent one end of the friction means engaging the latter end portion of the friction means, yieldable means normally urging the bracket into abutting engagement with the side of the opening opposite the end aforesaid of the friction means, means movable axially of the bore in the bracket for adjusting the friction means relative to the brake drum including an element having a diameter less than the diameter of the bore, yieldable means normally urging said element into abutting engagement with the side of the bore adjacent the last named end of the friction means and providing for shifting movement of the element circumferentially of the drum in a direction opposite the direction of shifting movement of the bracket, and an eccentric revolubly mounted on the bracket and engageable with the side aforesaid of the opening through the backing plate to adjust the bracket circumferentially of the drum and thereby accurately position the friction means in the drum.

12. In brake mechanism, a brake drum, a backing plate for the brake drum, brake friction means supported on the backing plate within the drum and having spaced ends, a bracket having a tubular portion extending in a direction parallel to the axis of the drum through an enlarged opening in the backing plate and disposed generally between the ends of the friction means, means movable axially of the tubular portion of the bracket for adjusting the friction means relative to the drum, yieldable means normally urging the friction means and bracket circumferentially of the drum in a direction toward one side of the opening through the backing plate, and an eccentric rotatably mounted on the tubular portion of the bracket and engageable with the side aforesaid of the opening through the backing plate to accurately center the friction means in the drum.

FRANK L. MAIN.